Patented Apr. 20, 1937

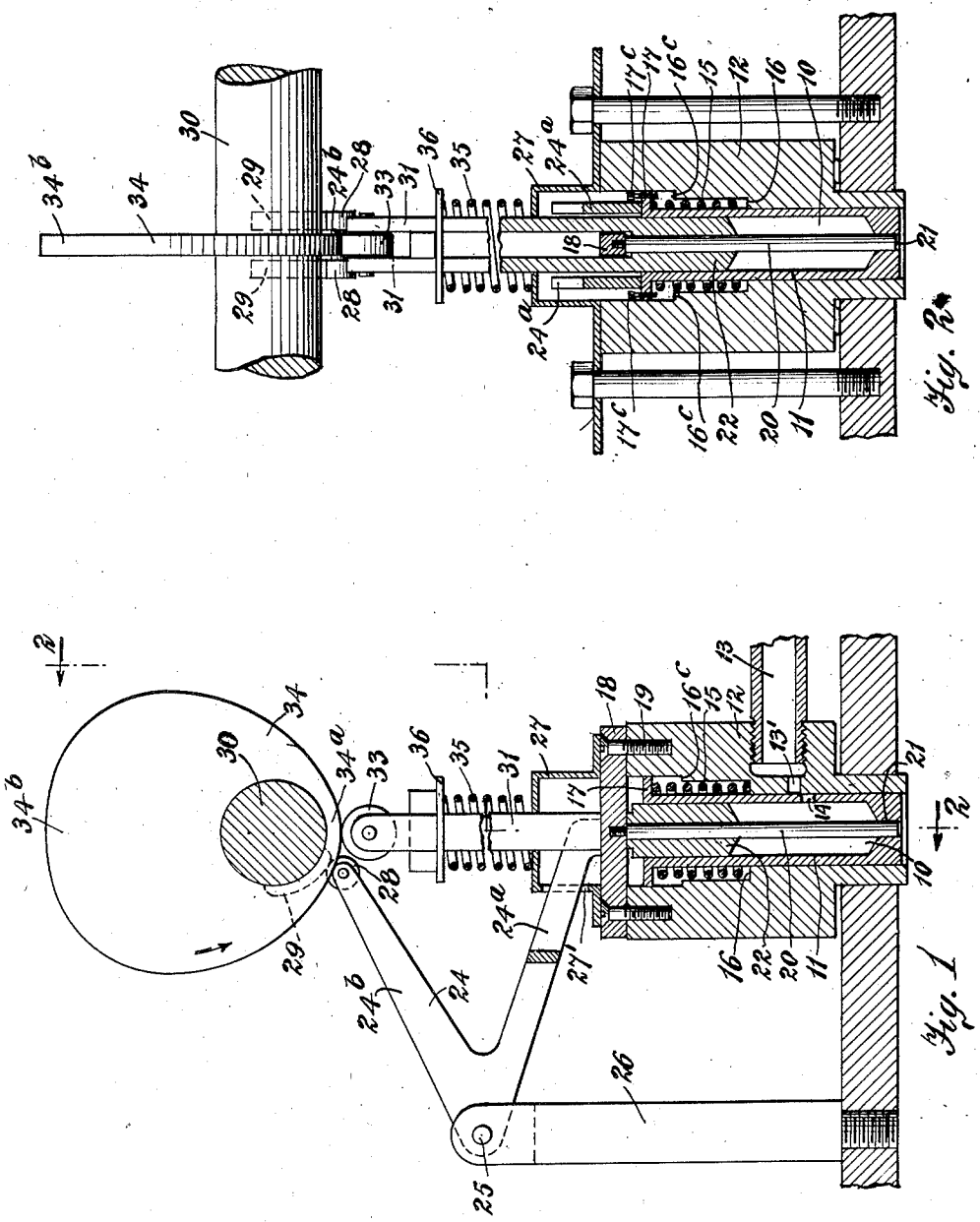

2,078,042

UNITED STATES PATENT OFFICE 2,078,042

FUEL INJECTION PUMP FOR INTERNAL COMBUSTION ENGINES

Alfred E. Traver, Brooklyn, N. Y.

Application July 30, 1935, Serial No. 33,800

7 Claims. (Cl. 299—107.2)

This invention relates to new and useful improvements in a fuel injection pump for internal combustion engines.

The invention has for an object the construction of an injector which is characterized by its ability to compress a gaseous mixture of liquid, solid, or gaseous fuel and air or other gas, and to deliver or inject the fuel mixture into an internal combustion engine.

A further object of this invention is to deliver the gaseous fuel mixture to the internal combustion engine completely, with only a trace of the mixture remaining in the injection pump.

Another object of this invention is to cause mixing of the fuel with the air or gas in the injector and the atomization and pulverization of the fuel and possibly the gasification of the fuel, before it is injected into the internal combustion engine.

Another object of this invention is to permit partial or complete combustion of the fuel in the injector in certain installations.

Another object of this invention is to permit the use of fuels of various cetene and octane ratings with satisfactory performance in Diesel engines, the phenomena known as ignition delay being eliminated by the partial precombustion of the fuel charge.

Another object of the invention is to provide an injector suitable for delivering a fuel charge or combustible mixture partially or completely combusted to a gas turbine, and other similar devices.

A further object of this invention is to provide for control of the internal combustion engine by throttling the intake to the injector. The throttling will have but small effect upon the pressures at which the fuel is burned and therefore provides for the utilization of more of the chemical energy of the fuel. A further advantage of the invention is that it permits the injection of very small quantities of fuel, as under idling conditions in an internal combustion engine without loss due to the poor atomization or dribbling of the nozzle.

It is also proposed to provide for the injection of a partially ignited fuel charge into the combustion chamber of an internal combustion engine so that complete combustion may take place without ignition delay which occurs with liquid injection systems.

The method or means for igniting the fuel charge while in the fuel injector or when it is forced into the combustion chamber of the combustion engine does not form a part of this invention. The ignition may be accomplished by either spark ignition or by compression ignition, both well known at the present time.

It should be understood that the fuel injector, according to this invention, may be used with or without partial combustion. In the event that ignition before injection is found not practical in certain designs of engines, ignition after injection may be used to fire the fuel charge.

The preparation of the fuel charge in the fuel injector makes possible faster combustion when the fuel mixture is in the combustion chamber of the internal combustion engine, and hence faster repetition of the cycle than is possible where solid injection of the fuel is used. The rapid combustion of the prepared fuel charge makes possible the use of more compact combustion chambers.

The details of the engines with which this injection pump may be used will not be given in this specification since they form no part of this invention.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a vertical sectional view of a fuel injector constructed according to this invention.

Fig. 2 is a fragmentary sectional view taken on the line 2—2 of Fig. 1.

The fuel injector, according to this invention, comprises a fuel compartment 10 for receiving a mixture of fuel and a quantity of air insufficient for complete combustion of the fuel, and means for compressing said fuel and air to finely atomize and at least partially gasify the fuel, and if desired, cause partial combustion to further assist in atomizing and gasifying the fuel. A means is provided for injecting said compressed fuel and air into the cylinder of the engine.

The fuel compartment 10 is in the form of a bore formed in a cylinder 11 which is slidably mounted in a body 12. The body 12 has an inlet 13 for a mixture of air and fuel from the carbureter (not shown on the drawing). The inlet terminates in a small inlet opening 13' communicating with the opening in which the cylinder 11 operates. The cylinder normally closes the inlet opening 13' acting as a valve, except when it is in its fully raised position and then a port opening 14 in the cylinder aligns with the inlet opening 13'. A means is provided for normally urging the cylinder 11 into the position in which the port aligns with the inlet. This means is in the form of a helical spring 15 disposed within a recess in the body 12 and acting against a shoulder 16 of the body and a flange 17 on the top end of the cylinder. A bar 18 is fixed by several screws 19 across the top of the body 12 and acts as a stop to limit upwards motion of the cylinder 11 to the said fully raised position.

A stationary stem 20 is fixedly mounted on the bar 18 and extends into the cylinder 11 coaxially thereof and has its free end extending into an opening 21 in the end of the cylinder 11 for normally closing this opening. The opening 21 is the discharge opening for the fuel compartment 10 as hereinafter further described. A piston 22 is arranged within the cylinder 11 and is slidably mounted on the stem 20.

A means is provided for moving the cylinder 11 into a slightly lowered position, as illustrated in Fig. 1, to entrap the fuel and air within the fuel compartment. This means consists of a bell crank 24 pivoted at its center by a pintle 25 upon a support 26. One arm 24a of the bell crank 24 is forked and the fingers of the fork engage through an opening 27' in a cover 27 which is engaged over the top of the body 12. These fingers rest freely on the flange 17 so as to be capable of depressing the cylinder. The other arm 24b of the bell crank is equipped with rollers 28 engaging cam elements 29 upon a shaft 30. The cam elements 29 are capable of slightly moving the bell crank so that it slightly lowers the cylinder 11.

A means is provided for moving the piston 22 to compress the entrapped fuel charge and air. This means consists of a stem 31 which is directly connected with the piston 22 and extends axially upwards therefrom. This stem 31 is of spaced sections to accommodate the bar 18 which extends between the sections. A roller 33 is mounted on the upper end of the stem 31 and engages against a large cam 34 mounted on the shaft 30. An expansion spring 35 acts between the cover 27 and a washer 36 which is fixedly mounted on the stem 31. The spring 35 serves to maintain the roller 33 in intimate contact with the cam 34. The cam 34 has a shallow area 34a which, when engaged by the roller 33, holds the piston 22 in its fully raised position. The cam broadens out from the shallow area to the deep area 34b located 180° therefrom, and by which the piston will be moved to its fully lowered position. The lowered position is one in which the piston 22 contacts with the bottom of the fuel compartment 10.

As the piston 22 moves downwards it compresses the entrapped air and fuel. A means is provided for releasing this entrapped charge so that it may be ejected from the discharge opening 21. This means makes use of the trapped air and fuel charge itself. When the air and fuel are compressed a certain amount the spring 15 will no longer be able to hold the cylinder 11, which then moves downwards to a position in which the opening 21 is free from the end of the stem 20. It is in this position that the opening 21 serves as a discharge, and continued downward motion of the piston 22 merely serves to eject the compressed air and fuel charge. Adjustable stops 17c are provided to limit the travel of the cylinder 11 and the amount which the spring 15 may be compressed. These stops permit raising the pressure of the gas mixture to a faster rate of injection at high speeds. The stops 17c engage against a shoulder 16c.

The operation of the device is as follows:—

The shaft 30 turns anti-clockwise, as viewed in Fig. 1. The cylinder 11 is in its slightly lowered position and there is a fresh supply of air and fuel within the fuel compartment 10. As the shaft 30 turns the piston 22 moves downwards and compresses the charge. This compression serves to atomize the mixture of air and fuel if the fuel is liquid, and serves to more finely pulverize the fuel if the fuel is a pulverized solid, due to the heat generated by compression. In addition, the compression serves to partly gasify the fuel as the temperature rises due to the compression. The fuel injector may be designed so that partial combustion takes place during the compression, or it may be designed so that the compression merely heats the entrapped mixture. Partial combustion takes place due to the fact that there is insufficient air to support complete combustion with the fuel compartment. The partial combustion further raises the temperature which further assists in gasifying the fuel charge.

When the piston 22 has reached a pre-determined position the compression will oppose the motion of the piston 22 to such an extent that the spring 15 will be compressed and the cylinder 11 will move downwards to a position in which the opening 21 is freed from the stem 20. Complete combustion of the prepared fuel and air takes place in the cylinder of the combustion engine. The charge may be ignited in the cylinder as previously explained.

As the piston 22 passes the port opening 14 the rollers 28 will move free from the cam 29 so that the bell crank is now free to move upwards. When the piston 22 has reached the complete down position, and the air fuel mixture has been completely expelled from between it and the bottom wall, it is in intimate contact with the bottom wall of the fuel compartment 10. Consequently, it is necessary that the end of the piston fit into the contour of the bottom wall. It is advisable that these parts be conical, as clearly shown on the drawing. When the piston 22 has ejected the complete fuel charge and the deep area 34b of the cam is passed, the stem 31 will be moved upwards. Instantly the cylinder 11 is no longer under pressure and the spring 15, and any pressure in the combustion chamber will return it to its raised position in which the port 14 aligns with the inlet 13'. At this time the port 14 is still closed by the piston 22 travelling upwards.

Upward motion of the cylinder 11 immediately closes and clears the discharge opening 21 by the opening engaging on the stem 20. Any residue gases which are within the fuel compartment will be immediately cooled by the expansion by the piston 22 as it moves upwards. When the piston passes the port 14 there will be suction. This suction causes intake of a new supply of mixed fuel and air. When the piston 22 reaches the full raised position the cam element 29 will move the bell crank 24 to slightly lower the cylinder 11 so that the port is cut off from the inlet 13'. The new charge is now ready to be compressed.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A fuel injector for internal combustion engines, comprising a body with an inlet for a fuel charge and a small quantity of air, a cylinder for a fuel charge and small quantity of air, and slidably mounted in said body and having a port normally aligning with said inlet, a stationary stem within the cylinder engaging a front opening therein for closing said opening, a piston in said cylinder and slidably on said stem, means for moving said cylinder to entrap the fuel charge and small quantity of air within said cylinder, means for moving said piston to compress the entrapped fuel charge and air to finely atomize and at least partially gasify it, and means for further moving said cylinder to free the opening from the stem so that the compressed fuel charge and air is discharged.

2. A fuel injector for internal combustion engines, comprising a body with an inlet for a fuel charge and a small quantity of air, a cylinder for a fuel charge and small quantity of air, and slidably mounted in said body and having a port normally aligning with said inlet, a stationary stem within the cylinder engaging a front opening therein for closing said opening, a piston in said cylinder and slidably on said stem, means for moving said cylinder to entrap the fuel charge and small quantity of air within said cylinder, means for moving said piston to compress the entrapped fuel charge and air to finely atomize and at least partially gasify it, and cause partial combustion of the fuel charge to further atomize and gasify it, and means for further moving said cylinder to free the opening from the stem so that the compressed fuel charge and air is discharged.

3. A fuel injector for internal combustion engines, comprising a body with an inlet for a fuel charge and a small quantity of air, a cylinder for a fuel charge and small quantity of air, and slidably mounted in said body and having a port normally aligning with said inlet, a stationary stem within the cylinder engaging a front opening therein for closing said opening, a piston in said cylinder and slidably on said stem, means for moving said cylinder to entrap the fuel charge and small quantity of air within said cylinder, means for moving said piston to compress the entrapped fuel charge and air to finely atomize and at least partially gasify it, means for further moving said cylinder to free the opening from the stem so that the compressed fuel charge and air is discharged, and resilient means for normally urging said cylinder into a position in which the port and inlet are in line with each other.

4. A fuel injector for internal combustion engines, comprising a body with an inlet for a fuel charge and a small quantity of air, a cylinder for a fuel charge and small quantity of air, and slidably mounted in said body and having a port normally aligning with said inlet, a stationary stem within the cylinder engaging a front opening therein for closing said opening, a piston in said cylinder and slidably on said stem, means for moving said cylinder to entrap the fuel charge and small quantity of air within said cylinder, means for moving said piston to compress the entrapped fuel charge and air to finely atomize and at least partially gasify it, means for further moving said cylinder to free the opening from the stem so that the compressed fuel charge and air is discharged, and resilient means for normally urging said cylinder into a position in which the port and inlet are in line with each other, comprising a spring acting between the body and said cylinder.

5. A fuel injector for internal combustion engines, comprising a body with an inlet for a fuel charge and a small quantity of air, a cylinder for a fuel charge and small quantity of air, and slidably mounted in said body and having a port normally aligning with said inlet, a stationary stem within the cylinder engaging a front opening therein for closing said opening, a piston in said cylinder and slidably on said stem, means for moving said cylinder to entrap the fuel charge and small quantity of air within said cylinder, means for moving said piston to compress the entrapped fuel charge and air to finely atomize and at least partially gasify it, means for further moving said cylinder to free the opening from the stem so that the compressed fuel charge and air is discharged, said stationary stem being supported on a bar mounted on said body, and said means for moving the cylinder, said latter means including a slotted stem with the sections thereof straddling the bar.

6. A fuel injector for internal combustion engines, comprising a body with an inlet for a fuel charge and a small quantity of air, a cylinder for a fuel charge and small quantity of air, and slidably mounted in said body and having a port normally aligning with said inlet, a stationary stem within the cylinder engaging a front opening therein for closing said opening, a piston in said cylinder and slidably on said stem, means for moving said cylinder to entrap the fuel charge and small quantity of air within said cylinder, means for moving said piston to compress the entrapped fuel charge and air to finely atomize and at least partially gasify it, and means for further moving said cylinder to free the opening from the stem so that the compressed fuel charge and air is discharged, said means for moving the cylinder to entrap the small quantity of air and fuel charge comprising a pivoted bell crank having one of its arms engaging against the cylinder and its other arm engaging a cam.

7. A fuel injector for internal combustion engines, comprising a body with an inlet for a fuel charge and a small quantity of air, a cylinder for a fuel charge and small quantity of air, and slidably mounted in said body and having a port normally aligning with said inlet, a stationary stem within the cylinder engaging a front opening therein for closing said opening, a piston in said cylinder and slidably on said stem, means for moving said cylinder to entrap the fuel charge and small quantity of air within said cylinder, means for moving said piston to compress the entrapped fuel charge and air to finely atomize and at least partially gasify it, and means for further moving said cylinder to free the opening from the stem so that the compressed fuel charge and air is discharged, said means for moving the piston comprising resilient means urging the piston in one direction, and a cam for moving the piston in the other direction.

ALFRED E. TRAVER.